United States Patent [19]

Bouvier et al.

[11] 4,119,966
[45] Oct. 10, 1978

[54] CLUTTER DISCRIMINATING APPARATUS FOR USE WITH PULSED DOPPLER RADAR SYSTEMS AND THE LIKE

[75] Inventors: David William Bouvier, Tempe; Charles H. Brenner; Walker Butler, both of Scottsdale, all of Ariz.

[73] Assignee: Motorola Inc., Schaumburg, Ill.

[21] Appl. No.: 815,760

[22] Filed: Jul. 14, 1977

[51] Int. Cl.$^2$ .............................................. G01S 9/42
[52] U.S. Cl. ...................................... 343/7.7; 325/477
[58] Field of Search ............... 343/7 A, 7.7; 325/323, 325/324, 377, 477

[56] References Cited

U.S. PATENT DOCUMENTS

| | | | |
|---|---|---|---|
| 3,500,396 | 3/1970 | Lampert et al. | 343/7 A |
| 3,680,096 | 7/1972 | Bosc | 343/5 DP |
| 3,707,718 | 12/1972 | Ames | 343/7.7 |
| 3,720,942 | 3/1973 | Wilmot et al. | 343/7.7 |
| 3,737,799 | 6/1973 | Stander | 325/477 |
| 3,761,922 | 9/1973 | Evans | 343/7 A |
| 3,797,014 | 3/1974 | Tompkins et al. | 343/5 DP |
| 3,828,348 | 8/1974 | Murray, Jr. | 343/7 A |
| 3,829,858 | 8/1974 | Bergkvist | 343/7 A |
| 3,838,422 | 9/1974 | MacArthur et al. | 343/7 A |
| 3,898,654 | 8/1975 | Vehrs, Jr. | 343/7 A |
| 3,908,190 | 9/1975 | Nathan et al. | 343/12 R |

*Primary Examiner*—Nelson Moskowitz
*Assistant Examiner*—Lawrence Goodwin
*Attorney, Agent, or Firm*—Eugene A. Parsons

[57] ABSTRACT

In apparatus for discriminating targets from clutter, a high threshold circuit for passing only signals with sufficient amplitude and a lower threshold circuit passing signals of a sufficient amplitude to range extent circuitry, which passes only signals within a predetermined duration and which do not have other range signals adjacent thereto, and to frequency extent circuitry, which passes only signals within a predetermined bandwidth and which do not have other frequency signals adjacent thereto. Signals which satisfy the amplitude, range and frequency requirements then provide an output indicative of a target; all other signals are rejected as clutter.

7 Claims, 2 Drawing Figures

CLUTTER DISCRIMINATING APPARATUS FOR USE WITH PULSED DOPPLER RADAR SYSTEMS AND THE LIKE

BACKGROUND OF THE INVENTION

1. Field of the Invention

In this description of the invention and the background thereof, pulsed doppler radars are utilized as an example because they are very common and well known, and the description of the present invention in conjuction therewith is relatively clear and simple. In general, pulsed doppler radars transmit pulses of coherent radio frequencies into a region under observation. These pulses are reflected by the objects in the region ad each object changes the frequency of the reflected pulse in dependence on the velocity of the object relative to the radar, as governed by the Doppler principle. Generally, objects which are moving relative to the ground in the region of observation are targets and signals reflected from the ground, i.e., trees waving in the wind, waves in water, clouds, etc. are commonly referred to as clutter. It is necessary that the clutter signals be discriminated against with a minimum deterioration in the effectiveness of the radar in detecting targets.

1. Description of the Prior Art

Many of the prior art detectors utilize a variable or floating threshold which measures the approximate amplitude of the clutter and maintains a threshold slightly above the major portion of the clutter. In this fashion, most of the clutter signals are eliminated and only the high amplitude signals are passed to the remainder of the circuitry.

In some radar apparatus two thresholds are utilized, e.g., U.S. Pat. No. 3,828,348, entitled "System for Minimizing Multiple Time Around Echos in a Coherent-On-Receive-Doppler Radar", patented Aug. 6, 1974, but the test for passing the signals is coherent/noncoherent. Others, e.g., U.S. Pat. No. 3,707,718, entitled "Radar System", issued Dec. 26, 1972, utilize clutter trackers to actually track the clutter and suppress it so that the targets may be recognized. All of these prior art systems still allow many false signals and are susceptible to tracking clutter or losing targets in clutter.

SUMMARY OF THE INVENTION

The present invention pertains to clutter discriminating apparatus for use with dopper radar systems and the like and includes high threshold means providing an output signal only when a radar return signal exceeds a predetermined high threshold, and low threshold means providing an output signal when the return signals exceed this predetermined low threshold, said low threshold means supplying the output signal to range extent means, which provide an output signal if the return signal is within a predetermined duration and does not have other signals adjacent thereto within a wider predetermined range or time period, and to frequency extent means, which provide an output signal only if the return signal lies within a relatively narrow predetermined frequency bandwidth and does not have other signals adjacent thereto within a wider predetermined frequency bandwidth, the apparatus indicating a target only when an output signal is received from the high threshold means, the range extent means and the frequency extent means for a return signal.

Radar returns from targets will generally lie within a relatively small band of frequencies and a relatively narrow range. Signals which exceed this small bandwidth and narrow range are assumed to be clutter. Also, signals adjacent to each other in frequency or range are assumed to be clutter. Thus, the low threshold is used to detect clutter and the high threshold is used to prevent false alarms, since the signal must exceed a predetermined amplitude to pass through the high threshold. The present apparatus provides a simple system for maintaining a relatively constant false alarm rate when operating in a clutter environment.

It is an object of the present invention to provide improved clutter discriminating apparatus.

It is a further object of the present invention to provide improved clutter discriminating apparatus which is capable of maintaining, in a simple fashion, a relatively constant false alarm rate when operating in a clutter environment.

It is a further object of the present invention to provide clutter discriminating apparatus which may be readily implemented using simple logic circuits without the need for computing average values, which requires relatively complex circuitry.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
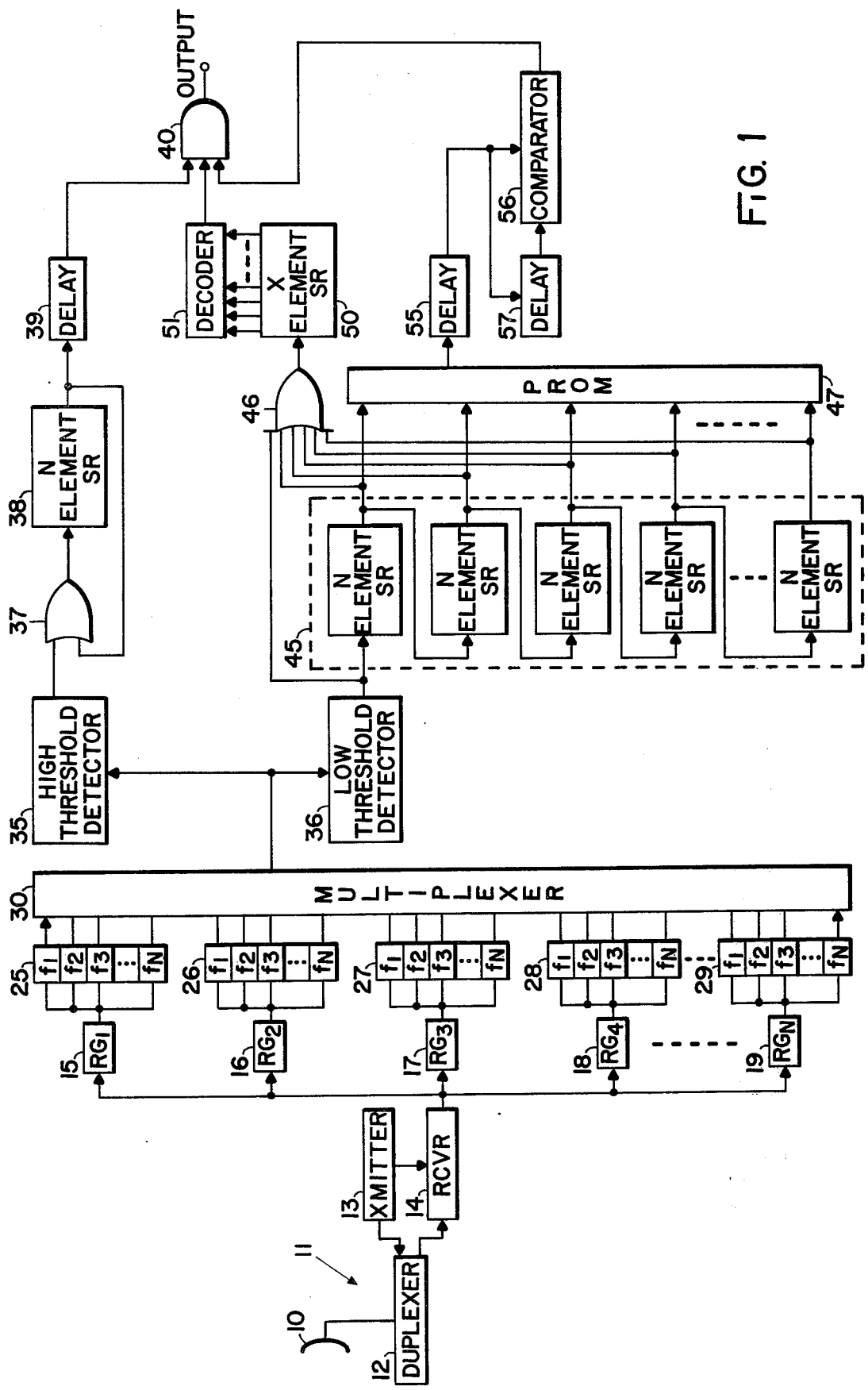
FIG. 1 is a block diagram of a pulsed doppler radar including clutter discriminating circuitry embodying the present invention.

Referring to FIG. 1, the number 10 indicates an antenna for a pulsed doppler radar, generally designated 11. The antenna 10 is connected to a duplexer 12 which electrically connects the antenna 10 to either the output of a transmiter 13 or the input of a receiver 14. The antenna 10, duplexer 12, transmitter 13 and receiver 14 will not be elaborated upon since these are standard components well known to those skilled in the art and are illustrated only to place the remainder of the circuitry in a complete environment. The output of the receiver 14 is connected to a plurality of range gates, 1 through N, which are designated 15 through 19. As is well known in the art, the range gates represent adjacent steps or sections of continuous range and any desired number, N, of range gates may be utilized, depending upon the frequency of the radar, pulse repetition rate, speed of the targets to be discerned, etc. The output of each of the range gates 15 through 19 is then applied to a bank of filters, there being N banks of filters numbered 25 through 29. Each of the banks of filters 25 through 29 has N filters therein with an output from each of the filters in each of the banks 25 through 29 connected to a multiplexer 30. Thus, the output of the radar 11 is divided into a plurality of range gates and each range gate is divided into a plurality of frequencies, which are serially read out of the multiplexer 30.

The output of the multiplexer 30 is applied to a high-threshold detector 35 and to a low-threshold detector 36. The output of the high-threshold detector 35 is connected to one input of an OR gate 37, the output of which is connected to the input of an N element shift register 38. The output of the shift register 38 is connected to a second input of the OR gate 37 and through a delay network 39 to one input of an AND gate 40. The output of the low-threshold detector is connected to an input of a serpentine delay line, serial-to-parallel converter, generally designated 45. The converter 45 consists of N-1 shift registers serially connected, with the outputs of each of the shift registers providing an output from the converter 45. Each of the shift registers is an N element register and there should be one less shift register than there are range gates with the number of elements in each shift register being equal to the number of filters in each of the filter banks 25 through 29. Thus, when all of the signals from all of the filter banks (except filter bank 29) are clocked into the shift registers in the converter 45 the signals from the last filter bank 29 pass directly through the converter 45 and the signals from each of the range gates are supplied at the output of the converter 45 in parallel, i.e., the first frequency from each of the range gates 15 through 19 appears at the outputs of the converter 45 in parallel and then the second frequency from each of the range gates appears, etc.

The N parallel signals from the converter 45 are applied to N inputs of an OR gate 46 and to N inputs of a programmable read-only-memory 47. The output of the OR gate 46 is applied to an X element shift register 50 which has parallel outputs connected to parallel inputs of a decoder 51. The shift register 50 and decoder 51 form a comparator which is precoded to accept only predetermined patterns. The output of the decoder 51 is connected to a second input of the AND gate 40. The output of the programmable read-only-memory 47 is connected to a delay 55 which is placed in the circuit to allow the data in the line to coincide, in time, with the data in the other lines. The output of the delay 55 is connected to one input of a comprator 56 and is also connected through a 1-bit delay 57 to a second input of the comparator 56. The output of the comparator 56 is connected to a third input of the AND gate 40.

The system illustrated in FIG. 1 has been actually implemented with eight range gates and 128 frequencies per range gate and, for convenience, the operation thereof will be explained utilizing these numbers. However, it should be understood that these numbers are only used for exemplary purposes and any desired combination of range gates and frequencies might be utilized. The shift register 38 has 128 elements and, because of the feedback from the output of the shift register 38 to the input of the OR gate 37, operates as a memory. All of the outputs from the 128 filters of the first range gate are clocked into the shift register 38 to fill the register. Then all of the outputs of the 128 filters in the second range gate are clocked into the shift register 38 and any highs or signals which passed through the high-threshold detector 35 from the filter bank 25 are stored in the shift register 38 with outputs of the filter bank 26. This continues until the 128 outputs from the filter bank 29, associated with range gate 8, are applied to the OR gate 37. The delay 39 is utilized to insure the output signals from the shift register 38 coincide with signals from the other two channels which are applied to the AND gate 40. With eight range gates and 128 frequencies per range gate there will be 1024 bits of information supplied serially from the multiplexer 30 to each of the threshold detectors 35 and 36. The output of the delay 39 represents an amplitude check of each of these bits, the output of the decoder 51 represents the frequency extent of these bits and the output of the comparator 56 represents the range extent of these bits. For any one or more of these bits to be recognized as a valid target, the output of all three of the channels must be applied to the AND gate 40 simultaneously, which is the reason that the delays 39 and 55 have been included in the circuit.

Figure 2:
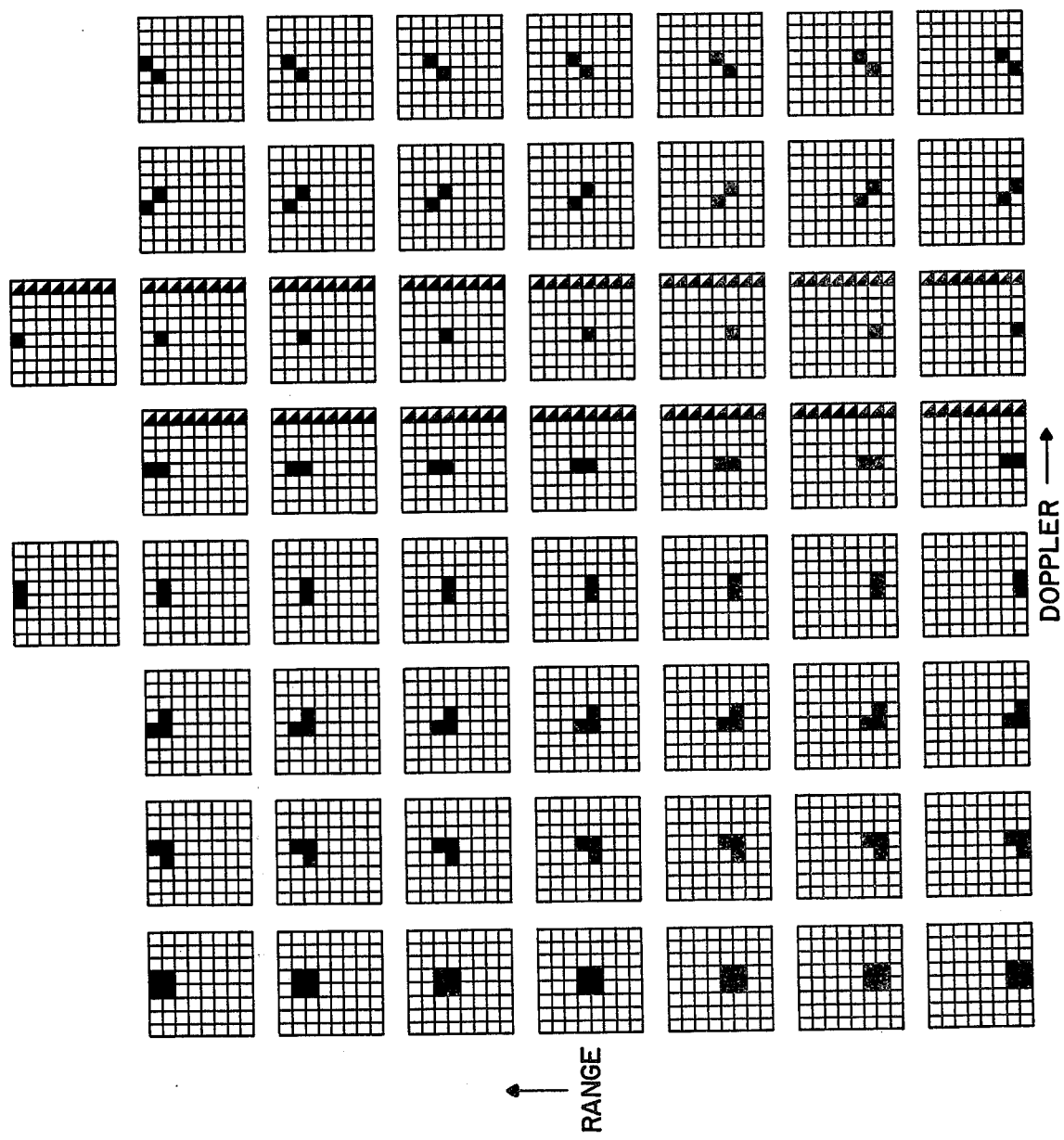
FIG. 2 is a chart of acceptable target patterns for the clutter discriminating circuitry of FIG. 1.

The train of bits is also applied through the low-threshold detector 36 to the serial-to-parallel converter 45. The converter 45 applies parallel signals to the OR gate 46 and PROM 47 8 bits at a time and the bits are aligned so that the first frequency of each range gate is applied to the inputs simultaneously, then the second frequency, third frequency, etc. In this embodiment, the shift register 50 has eight elements so that the system is always looking at an 8 × 8 matrix, as illustrated in FIG. 2. The OR gate 46 looks at eight first frequencies simultaneously and if the threshold of the detector 36 has been crossed on any one or more range gates, the OR gate 46 indicates that a detection has occurred on that frequency. This indication is clocked into the shift register 50. The decoder 51 is connected to the eight parallel outputs of the shift register 50, so that it looks at eight adjacent frequencies simultaneously. The decoder 51 is programmed to indicate a valid detection whenever the shift regiter 50 is in states 16, 17, or 24. The binary representation of these states are: 00010000, 00010001, 00011000, respectively. Referring to FIG. 2, it should be noted that these three states cover all of the acceptable target patterns in the doppler frequency axis. If a threshold crossing appears at any other frequency the decoder 51 will not provide a valid detection and the signals will be rejected as clutter.

The eight first frequencies of the eight range gates are simultaneously applied to the eight inputs of the PROM 47, which is programmed to provide an output if a threshold crossing has occurred in a single or two adjacent range gates. If detections occur in two nonadjacent, or three or more range gates the PROM 47 recognizes the crossings as clutter and rejects them. The output signals from the PROM 47, after being delayed by the delay 55, are applied to one input of the comparator 56. The signals are also delayed by one bit in the delay 57 and applied to a second input of the comparator 56. The comparator 56 essentially compares one row of eight frequencies to the adjacent row of eight frequencies to provide the acceptable target patterns illustrated in FIG. 2. The comparator 56 is set up to allow exact comparisons or plus or minus one bit on either side of a single bit. For example, if a first group of frequencies has a single crossing at one range the next group of frequencies may have no crossings, a crossing at the same range, or crossings in either adjacent range for the comparator 56 to indicate a valid target. When these requirements are met the comparator 56 supplies an output signal to the AND gate 40 and, if output signals are simultaneously applied to the two other inputs of the AND gate 40 an output signal is provided indicating a valid target.

While the system has been shown with three parallel channels determining amplitude, frequency extent and range extent simultaneously, it should be understood that many other types of embodiments might be devised including a serial arrangement where each of the requirements must be passed before the next requirement is checked. The operation of the present system is dependent upon the fact that clutter signals have some characteristics that, in general, allow it be discriminated from a true target. These characteristics are: diffuse clutter from non-specular targets appears equally in many range gates, whereas a true target can appear in only two adjacent gates; clutter is usually spread into more than two frequency bins whereas a true target will appear in only one or two frequency bins; and sometimes clutter can be stronger than the true target signal. Since clutter can cause false acquisitions, it is desirable to find a method of reducing these false acquisitions to a negligible level and also in those cases where a false acquisition has occurred a method of recognizing when the radar is tracking on a clutter signal so the system can return to the search mode. In general, strong clutter is easy to recognize and reject, while weak clutter will not generally produce sufficient false acquisition signals to cause a problem. In-between clutter power levels presents the worst case situation because it appears very erratically and tends to look like a target. The present system reduces the preacquisition false alarm rate by using a high and low threshold coupled with range and frequency discriminants. The lower threshold is positioned to increase the number of threshold crossings, which is particularly effective where the false alarm rate due to clutter is low. Thus, the present system provides simple apparatus and a simple method of maintaining a relatively constant false alarm rate when operating in a clutter environment. Further, the structure is readily implemented using simple logic circuits without the need for computing average values and the relatively complex circuitry required therefor.

While we have shown and described a specific embodiment of this invention, further modifications and improvements will occur to those skilled in the art. We desire it to be understood, therefore, that this invention is not limited to the particular form shown and we intend, in the appended claims, to cover all modifications which do not depart from the spirit and scope of this invention.

What is claimed is:

1. Clutter discriminating apparatus for use with doppler radar systems comprising:
    (a) high threshold means having a predetermined high threshold and providing an output signal when an input signal having an amplitude exceeding the predetermined high threshold is received;
    (b) low threshold means having a predetermined low threshold, lower in amplitude than the predetermined high threshold, and providing an output signal when an input signal having an amplitude exceeding the predetermined low threshold is received;
    (c) timing means connected to receive the output signals from the low threshold means and determine the time-position thereof relative to a reference time, said timing means providing an output signal each time an output signal is received from the low threshold means which is within a narrow predetermined time period and does not have other signals adjacent thereto within a wider predetermined time period;
    (d) frequency determining means connected to receive the output signals from the low threshold means and determine the frequency thereof, said frequency determining means providing an output signal each time one output signal is received from the low threshold means which is within a relatively narrow predetermined frequency bandwidth and does not have other signals adjacent thereto within a wider predetermined frequency bandwidth; and
    (e) coincidence means connected to receive the output signals from said high threshold means, said timing means and said frequency determining means and providing a detection signal upon each coincidence of all three output signals.

2. In a pulsed doppler radar system including a transmitter and a receiver providing doppler return signals, clutter discriminating apparatus for separating signals indicative of targets from clutter signals comprising:
    (a) circuitry providing doppler return signals indicative of range and frequency of received signals;
    (b) high threshold means connected to receive the doppler return signals from said circuitry, said high threshold means having a predetermined high threshold and providing a first indication when a doppler return signal having an amplitude exceeding the predetermined high threshold is received;
    (c) low threshold means connected to receive the doppler return signals from said circuitry, said low threshold means having a predetermined low threshold, lower in amplitude than the predetermined high threshold, and providing an output signal when a doppler return signal having an amplitude exceeding the predetermined low threshold is received;
    (d) range extent means coupled to receive the output signals from said low threshold means for determining the time duration of each output signal and the range and providing a second indication for each output signal that lies within a predetermined time duration and does not have other signals adjacent thereto within a predetermined range;
    (e) frequency extent means coupled to receive the output signals from said low threshold means for determining the frequency separation of adjacent output signals and providing a third indication for each output signal that lies within a predetermined relatively narrow bandwidth and which does not have other output signals adjacent thereto within a wider predetermined bandwidth; and
    (f) means coupled to said high threshold means, said range extent means and said frequency extent means for receiving the first, second and third indications, respectively, and providing an indication of a target each time the first, second and third indications are present for a doppler return signal.

3. Clutter discriminating apparatus as claimed in claim 2 wherein the circuitry providing doppler return signals includes circuits for dividing the range of the radar into a plurality of equal time increments or range gates and for dividing each range gate into a plurality of different frequencies.

4. Clutter discriminating apparatus as claimed in claim 3 wherein the predetermined time duration of the range extent means is two range gates and the predetermined range is the remainder of the plurality of range gates.

5. Clutter discriminating apparatus as claimed in claim 3 wherein the predetermined relatively narrow bandwidth is two adjacent frequencies in any one range gate and the wider predetermined bandwidth is approximately eight adjacent frequencies in one range gate.

6. A method of discriminating preferred signals from clutter signals comprising the steps of:

(a) determining the amplitude of all the signals and providing an output signal for each signal that exceeds a first predetermined threshold and providing a first indication for each signal that exceeds a second predetermined threshold higher than the first predetermined threshold;

(b) determining the time duration of each output signal and the time separation from adjacent signals and providing a second indication for each output signal that lies within a relatively narrow time period and does not have other signals adjacent thereto within a wider predetermined time period;

(c) determining the frequency bandwidth of each output signal and the frequency separation of adjacent output signals and providing a third indication for each output signal that lies within a predetermined relatively narrow bandwidth and which does not have other signals adjacent thereto within a wider predetermined bandwidth; and (d) providing a preferrred signal detection indication each time the first, second and third indications are present for a signal.

7. In a pulsed doppler radar system including a transmitter and receiver providing doppler return signals, a method of discriminating signals indicative of targets from clutter signals comprising the steps of:

(a) determining the amplitude of all the doppler return signals and providing an output signal for each doppler return signal that exceeds a first predetermined threshold and providing a first indication for each signal that exceeds a second predetermined threshold higher than the first predetermined threshold;

(d) determining the time duration of each output signal and the range and providing a second indication for each output signal that lies within a predetermined time duration and does not have other signals adjacent thereto within a predetermined range;

(c) determining the frequency bandwidth of each output signal and the frequency separation of adjacent output signals and providing a third indication for each output signal that lies within a predetermined relatively narrow bandwidth and which does not have other output signals adjacent thereto within a wider predetermined bandwidth; and (d) providing an indication of a target each time the first, second and third indications are present for a doppler return signal.

* * * * *